Dec. 4, 1956 P. J. H. JANSSEN 2,773,121

VIDEO AMPLIFIER WITH SIGNAL-INTENSITY-DETERMINED THRESHOLD

Filed Nov. 1, 1951

INVENTOR
Peter Johannes Hubertus Janssen
By [signature]
Agent

United States Patent Office 2,773,121

Patented Dec. 4, 1956

2,773,121

VIDEO AMPLIFIER WITH SIGNAL-INTENSITY-DETERMINED THRESHOLD

Peter Johannes Hubertus Janssen, Eindhoven, Netherlands, assignor to Hartford National Bank and Trust Company, Hartford, Conn., as trustee Application November 1, 1951, Serial No. 254,258

Claims priority, application Netherlands November 9, 1950

9 Claims. (Cl. 178—7.3)

Figures 1, 2A, 2B, 2C, 3:
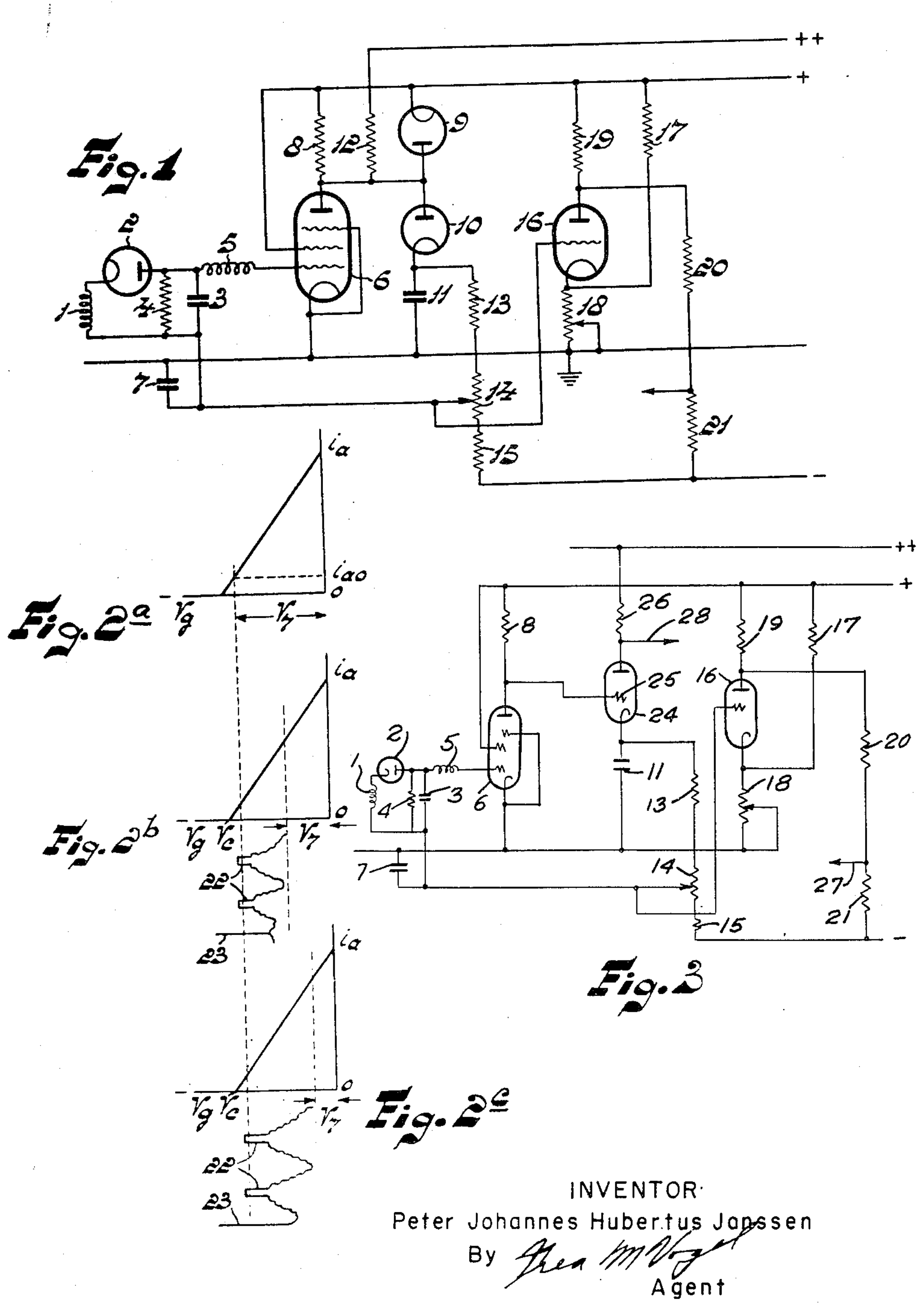

As is known, automatic gain-control circuit-arrangements are employed in television receivers and, similarly to normal radio-receivers, the control-curve generally consists of two parts. If the amplitude of the incoming high-frequency signal increases from zero onwards, the signal supplied to the reproducer tube will initially increase substantially proportionally to the incoming high-frequency amplitude. As soon as the incoming high-frequency signal attains a given amplitude, the gain-control becomes operative and the strength of the signal supplied to the reproducer tube remains substantially the same upon a further increase in strength of the incoming signal.

In television receivers, it is very desirable that strong interference impulses should be limited to a value at the most slightly exceeding that of the desired signal.

As long as the automatic gain control is operative, so that the amplitude of the demodulated signal is substantially constant, this condition can readily be satisfied by employing a limiter which becomes operative above this amplitude.

On receiving a high-frequency signal of small amplitude, for example from a distant transmitter, with which the automatic gain control is not yet operative, such a limitation is not well practicable without the need for further means, hence the ratio between the amplitude of the desired signal and the amplitude of the interference impulses will become unfavourable.

Particularly under such circumstances, however, effective limitation of interfering signals is imperative.

The present invention has for its object to provide an automatic gain control circuit-arrangement, in which the amplitude of the interfering signals is limited substantially to the amplitude of the incoming signal independently of the amplitude of the latter.

The circuit-arrangement according to the invention, in which the demodulated signal is supplied to a control grid of a discharge tube, is characterized in that a bias for the control grid of the tube is derived from an output circuit of the tube, with which bias the peak value of the anode alternating voltage of the tube is substantially stabilized, and under the control of this bias a control voltage for automatic gain-control is produced on exceeding a particular value.

In order that the invention may be readily carried into effect, two examples will now be described in detail with reference to the accompanying drawings, in which:

Fig. 1 shows one form of the circuit-arrangement according to the invention, whose operation will be explained with reference to the anode current grid voltage characteristic curves shown in Figures $2^a$, $2^b$ and $2^c$ and Fig. 3 shows an alternative embodiment of the circuit-arrangement depicted in Fig. 1, which moreover permits the synchronizing signal and the image (video) signal to be separated in a simple manner.

In Fig. 1, the high frequency or intermediate frequency television signal across a coil 1 is demodulated by means of the diode 2 and the parallel-connection of a capacitor 3 and a resistor 4.

The demodulated signal across a resistor 4 is supplied through a coil 5 to the control grid of a tube 6.

A capacitor 7 is connected in the control grid circuit between the resistor 4 and the earthed cathode of tube 6.

On reception of a television-signal modulated in a negative sense on a carrier wave, a demodulated television signal occurs in the indicated pass-direction of the diode 2 at the control grid of tube 6, the synchronizing pulses reducing the potential of the control grid.

A signal with positively directed synchronizing signals then occurs across the anode resistor 8 of tube 6.

The anode of tube 6 is connected to the anodes of diodes 9 and 10, the former being connected in parallel with the anode resistor 8.

The diode 10, in series with a capacitor 11, is connected in parallel with tube 6.

Furthermore, the anode of tube 6 is connected through a resistor 12 to the positive terminal of a supply, the voltage of which exceeds that of the anode supply.

The cathode of diode 10 is connected by way of the series-connection of resistors 13, 14 and 15 to the negative terminal of a voltage supply, whose other terminal is earthed. The resistor 13 and the upper part of the resistor 14, along with the capacitor 7, form an integrating network for supplying bias voltage to the control grid of the tube 6.

A tap of a resistor 14 is connected to the unearthed side of capacitor 7 and to the control grid of a discharge tube 16.

By means of a potentiometer 17, 18 which is connected to the anode supply and the variable resistor 18 of which is inserted in the cathode lead of tube 16, the control grid of tube 16 is negatively biased.

The anode of tube 16 is connected on the one hand through a resistor 19 to the anode supply and on the other hand by way of the series-connection of resistors 20 and 21 to the negative voltage supply.

As will be seen later, the control voltage for automatic gain-control is taken from a resistor 21 as indicated at 27.

Leaving the operation of diode 9 out of consideration, the negative bias for the control grid of tube 6 is adjusted by means of the potentiometer 14 such that the tube 6 passes only little anode current in the absence of signals.

In Figure $2^a$ the negative bias $V_7$ then set up across the capacitor 7 is plotted along the abscissa of the anode current grid voltage characteristic. At this value of the bias an anode current $i_{ao}$ passes through the resistor 8.

As the anode voltage is high, the diode 10 is conductive and since the resistors 13, 14 and 15 in series have a high resistance, the voltage across capacitor 11 will substantially correspond to the voltage of the anode supply less the small voltage drop across the anode resistor 8.

When a signal modulated in a negative sense is developed across coil 1, the demodulated signal will tend still further to reduce the potential of the control grid of tube 6 below the bias voltage value, thereby causing an increase in voltage at the anode of the tube. As a result thereof, the voltage across capacitor 11 increases, and this increased voltage is supplied through potentiometer 14 to the capacitor 7, owing to which the amplitude of the negative bias $V_7$ diminishes.

Consequently, the drop of the control grid potential brought about by the incoming signal is counteracted and substantially compensated for by correct adjustment of potentiometer 14, so that the peak value of the anode alternating voltage of tube 6 is also substantially stabilized.

In Fig. $2^b$, the television signal appearing at the control grid of tube 6 is shown below the abscissa, the peaks of the synchronizing signal 22 extending short of the cut-off point $V_c$ of the $i_a-V_g$ characteristic curve and an interfering impulse 23 being limited practically to the peak value of the synchronizing signal.

As appears from the drawing, the negative bias $V_7$ is smaller than in Figure $2^a$.

Upon a further increase of the incoming signal, the negative bias $V_7$ decreases still further, as shown in Fig. $2^c$.

The position of the peaks of the synchronizing signal 22 has practically not changed and the interfering impulse 23 is again limited to the same level as these peaks.

During the operation of the circuit-arrangements as described, the automatic gain control has not yet become operative, because the voltage $V_7$ and the negative voltage set up across resistor 18 cut-off the tube 16.

With an increase in amplitude of the incoming signal across coil 1, the negative voltage $V_7$ decreases until, in accordance with the value of resistor 18, the negative bias of tube 16 has fallen to such a point as to render this tube conductive.

The voltage drop then occurring across resistor 19 is unsuited to act as a control voltage due to the absolute value of this voltage.

This absolute value is reduced by means of the potentiometer 20, 21 connected between the anode and the negative voltage supply, with the result that the anode voltage is substantially compensated.

The control voltage for automatic gain control, which is taken from resistor 21, influences in a known manner the amplification factor of one or more stages preceding the demodulator of the receiver.

If this control becomes operative, for example at a voltage $V_7$ indicated in Fig. $2^c$, the amplitude of the demodulated signal will practically no longer change with an increase in strength of the incoming signal, hence the position of this signal and of the interfering signals with respect to the $i_a-V_g$ characteristic of tube 6 remains unchanged, as is shown in Fig. $2^c$.

The circuit-arrangement has the additional advantage that, by controlling the value of resistor 18, contrast control is obtained without increasing the interference susceptibility of the receiver.

If the $i_a-V_g$ characteristic is curved in the neighbourhood of the cut-off point, the amplitude of the synchronizing pulses occurring in the anode circuit of tube 6 is reduced with respect to the image signal.

This is mitigated by connecting the diode 9 in parallel with the anode resistor 8 and by biasing this diode positively by way of a resistor 12.

If the resistor 8 is traversed by a small current, the diode 9 is conductive and the output voltage taken from resistor 8 is substantially short-circuited.

If the tube 6 is traversed by a larger current, the anode voltage of tube 6 decreases further until, despite the biased diode, it is cut off and the output signal is no longer suppressed.

Thus, the lower part of the characteristic curve of tube 6 is not utilized and practically only the substantially straight part of the curve is worked in.

With the use of a diode 9, in the absence of incoming signals, the control-grid of tube 6 should be so biased as to work particularly in this straight part of the tube characteristic.

To be complete it is pointed out that, in the circuit-arrangement shown in Fig. 1, the time constant of the peak detector network comprising capacitor 11, resistor 13 and the upper part of resistor 14 preferably is approximately equal to 2 to 10 times the duration of one line of the television signal.

Furthermore, the circuit-arrangement according to the invention has an important advantage in conjunction with the separation, necessary in television receivers, of image signal and synchronisation signal.

Fig. 3 shows an alternative embodiment of the circuit-arrangement depicted in Fig. 1. Corresponding elements bear the same reference numerals.

In Fig. 3, the anode of tube 6 is connected to the control grid 25 of a tube 24. The cathode lead again comprises a capacitor 11 and the anode circuit comprises a resistor 26 which is connected to a point of higher potential.

The peak values of the signal appearing at the anode 8, i. e. the synchronizing pulses, always charge the capacitor 11 to the required value and current impulses occur in the anode circuit 26 at these instants, so that the synchronizing signal can be taken from this resistor as indicated at 28.

What I claim is:

1. In a television receiver wherein a negatively-modulated incoming signal is demodulated to provide a video signal combined with negative-going synchronizing pulses, apparatus for deriving an automatic gain control voltage from the demodulated signal comprising an amplifying stage including an electron discharge tube having a cathode, a grid and an anode, a source of direct-current operating voltage having a positive-polarity terminal and a negative-polarity terminal, a resistor connected between said anode and said positive-polarity terminal, means connecting said cathode to said negative-polarity terminal, means connected to apply said demodulated signal to said grid to produce an alternating voltage at said anode in accordance with said signal, a source of constant bias voltage connected to normally bias said grid with respect to said cathode at a value to cause said tube to pass relatively little current in the absence of said signal, a biasing circuit comprising a unilateral conductive element coupled to said anode and a filter connected to the output of said unilateral conductive element thereby to derive from said alternating voltage a variable bias voltage having a magnitude which depends on the amplitude of said alternating voltage and including means to apply said variable bias voltage to said grid relative to said cathode to provide a variable component of bias voltage at said grid and thereby stabilize said alternating voltage, and automatic gain control means including an electron tube containing an input electrode and an output electrode, sources of operating potentials for said last-named electrodes, impedance members respectively connected between said electrodes and said sources of operating potentials, said operating potentials having values of voltage to cause said last-named tube to be normally biased to cut-off, and means connected to apply said variable bias voltage to said input electrode whereby an automatic gain control voltage is produced at said output electrode solely when said variable bias voltage exceeds a predetermined value.

2. A receiver as claimed in claim 1, in which said electron tube further comprises a cathode, and including a resistor connecting said last-named cathode to said negative-polarity terminal, and means coupled to said output electrode to derive said automatic gain control voltage therefrom.

3. A receiver as claimed in claim 1, in which said source of constant bias voltage has a value to cause said electron discharge tube to be just conductive in the absence of said demodulated signal at said grid.

4. A receiver as claimed in claim 1, in which said unilateral conductive element is a diode connected to function as a peak detector and having an output electrode at which said synchronizing pulses are derived.

5. In a television receiver wherein a negatively-modulated incoming signal is demodulated to provide a video signal combined with negative-going synchronizing pulses, apparatus for deriving an automatic gain control voltage from the demodulated signal comprising an amplifying stage including an electron discharge tube having a cathode, a grid and an anode, a source of direct-current operating voltage having a positive-polarity terminal and a negative-polarity terminal, a resistor connected between said anode and said positive-polarity terminal, means connecting said cathode to said negative-polarity terminal, means connected to apply said demodulated signal to said grid to produce an alternating voltage at said anode in accordance with said signal, a biasing circuit comprising a diode having a plate and a cathode, said plate being connected to said anode, a first capacitor connected between said diode cathode and said tube cathode, a source of negative bias voltage, a resistor connected between said diode cathode and said source of negative bias voltage, a second capacitor connected between said tube cathode and a point on said resistor whereby there is developed across said second capacitor a constant bias voltage in accordance with the value of said negative bias voltage and a variable bias voltage in accordance with the value of said alternating voltage, means connected to apply said constant bias voltage and said variable bias voltage to said grid, said constant bias voltage having a value to cause said tube to pass relatively little current in the absence of said signal whereby said variable bias voltage causes said tube to pass relatively greater current in accordance with the magnitude of said signal, and automatic gain control means including an electron tube having a grid electrode, a cathode electrode and an anode electrode, a resistor connected between said cathode electrode and said negative-polarity terminal, a resistor connected between said anode electrode and said positive-polarity terminal, a further resistor connected between said output electrode and said source of negative bias voltage, a resistor connected between said grid electrode and said source of negative bias voltage, whereby said electron tube is biased normally to cut-off, means connected to apply said variable bias voltage to said grid electrode whereby an automatic gain control voltage is produced at said anode electrode solely when said variable bias voltage exceeds a predetermined value, and means connected to a point on said further resistor to derive said automatic gain control voltage therefrom.

6. A receiver as claimed in claim 5, in which said resistor connecting the cathode of said electron tube to said negative-polarity terminal is variable in order to control the contrast of said television receiver, and further including a resistor connected between the last-mentioned cathode and said positive-polarity terminal.

7. In a television receiver wherein a negatively-modulated incoming signal is demodulated to provide a video signal combined with negative-going synchronizing pulses, apparatus for deriving an automatic gain control voltage from the demodulated signal comprising an amplifying stage including an electron discharge tube having a cathode, a grid and an anode, a source of direct-current operating voltage having a positive-polarity terminal and a negative-polarity terminal, a resistor connected between said anode and said positive-polarity terminal, means connecting said cathode to said negative-polarity terminal, means connected to apply said demodulated signal to said grid to produce an alternating voltage at said anode in accordance with said signal, said tube having a characteristic curve which is non-linear in the cut-off region thereof, a biasing circuit comprising a first diode and a second diode each having a plate and a cathode, the plates of said diodes being connected to each other and to said anode, the cathode of said first diode being connected to said positive-polarity terminal, a source of positive-polarity potential having a greater magnitude than the voltage at said positive-polarity terminal, a resistor connected between said anode and said source of positive-polarity potential whereby said last-named resistor and said first diode compensate for said non-linearity in the characteristic curve of said tube, a source of negative bias voltage, a resistor having a tap and connected between the cathode of said second diode and said source of negative bias voltage, a first capacitor connected between the cathode of said second diode and the cathode of said tube, a second capacitor connected between said tap and the cathode of said tube whereby there is developed across said second capacitor a constant bias voltage in accordance with the value of said negative bias voltage and a variable bias voltage in accordance with the value of said alternating voltage, means connected to apply said constant bias voltage and said variable bias voltage to said grid, said constant bias voltage having a value to cause said tube to pass relatively little current in the absence of said signal whereby said variable bias voltage causes said tube to pass relatively greater current in accordance with the magnitude of said signal, and automatic gain control means including an electron tube containing an input electrode and an output electrode, sources of operating potentials for said last-named electrodes, impedance members respectively connected between said electrodes and said sources of operating potentials, said operating potentials having values of voltage to cause said last-named tube to be normally biased to cut-off, and means connected to apply said variable bias voltage to said input electrode whereby an automatic gain control voltage is produced at said output electrode solely when said variable bias voltage exceeds a predetermined value.

8. In a television receiver wherein a negatively-modulated incoming signal is demodulated to provide a video signal combined with negative-going synchronizing pulses, apparatus for deriving an automatic gain control voltage from the demodulated signal and for separating the synchronizing pulses from the demodulated signal, comprising first, second and third electron discharge tubes each having a cathode, a grid and an anode, a source of operating voltage having a positive-polarity terminal and a negative-polarity terminal, two resistors connected respectively between the anodes of said first and third tubes and said positive-polarity terminal, means connecting the cathodes of said first and third tubes to said negative-polarity terminal, a source of positive potential, a resistor connected between the anode of said second tube and said source of positive potential, a capacitor connected between the cathodes of said first and second tubes, a source of negative bias potential, a resistance connected between the cathode of said second tube and said source of negative bias potential, means connecting the grid of said first tube to a point on said resistance, said negative bias potential having a value to normally bias said first tube with a constant bias so as to pass relatively little current in the absence of said signal, means to apply the demodulated signal to the grid of said first tube to produce an alternating voltage at the anode thereof, a connection between the anode of said first tube and the grid of said second tube whereby a variable bias voltage is developed at said capacitor in accordance with said alternating voltage and is applied to the grid of said first tube thereby stabilizing said alternating voltage and whereby said synchronizing pulses appear at the anode of said second tube, means connected to derive said synchronizing pulses from the anode of said second tube, a resistor connected between the cathode of said third tube and said negative-polarity terminal, a resistor connected between the grid of said third tube and said source of negative bias potential, thereby to bias said third tube in cut-off condition, means connected to apply said variable bias voltage to the grid of said third tube to render said third tube conductive only when said variable bias voltage exceeds a predetermined value, thereby producing an automatic gain control voltage at the anode of said third tube, and means connected to derive said automatic gain control voltage from the anode of said third tube.

9. A circuit arrangement for automatic gain control in a television receiver for the reception of negatively modulated television signals, comprising a demodulator connected to receive said signals and provide at an output terminal thereof a video signal combined with negative-going synchronizing pulses, an electron discharge tube having a cathode, a grid and an anode, a source of operating voltage having a positive-polarity terminal and a negative-polarity terminal, a resistor connected between said anode and said positive-polarity terminal, means connecting said cathode to said negative-polarity terminal, a source of negative bias voltage connected to said grid and having a value to normally bias said tube at a constant value to pass relatively little current in the absence of said signal, direct-current conductive means connecting said output terminal to said grid whereby the demodulated signal produces an alternating signal voltage at said anode, an integrating network having input and output terminals, a rectifier connected directly between said anode and said input terminal and polarized to have relatively greater conductance for said synchronizing pulses than for said video signal whereby a variable bias voltage is produced at the output terminal of said integrating network in accordance with the magnitude of said television signals, means electrically connecting the last-mentioned output terminal to said grid to apply said variable bias voltage thereto and thereby stabilize said alternating signal voltage, and means including an electron tube containing an input electrode and an output electrode, sources of operating potentials for said last-named electrodes, impedance members respectively connected between said electrodes and said sources of operating potentials, said operating potentials having values of voltage to cause said last-named tube to be normally biased to cut-off, and means connected to apply said variable bias voltage to said input electrode whereby an automatic gain control voltage is produced at said output electrode solely when said variable bias voltage exceeds a predetermined value.

References Cited in the file of this patent

UNITED STATES PATENTS

| | | |
|---|---|---|
| 2,244,240 | Blumlein | June 3, 1940 |
| 2,258,732 | Blumlein et al. | Oct. 14, 1941 |
| 2,572,179 | Moore | Oct. 23, 1951 |
| 2,637,773 | Bedford | May 5, 1953 |

OTHER REFERENCES

"Radio Engineering," 3rd edition, Terman, pp. 846–851, McGraw-Hill Book Co., 1947.